Patented June 10, 1952

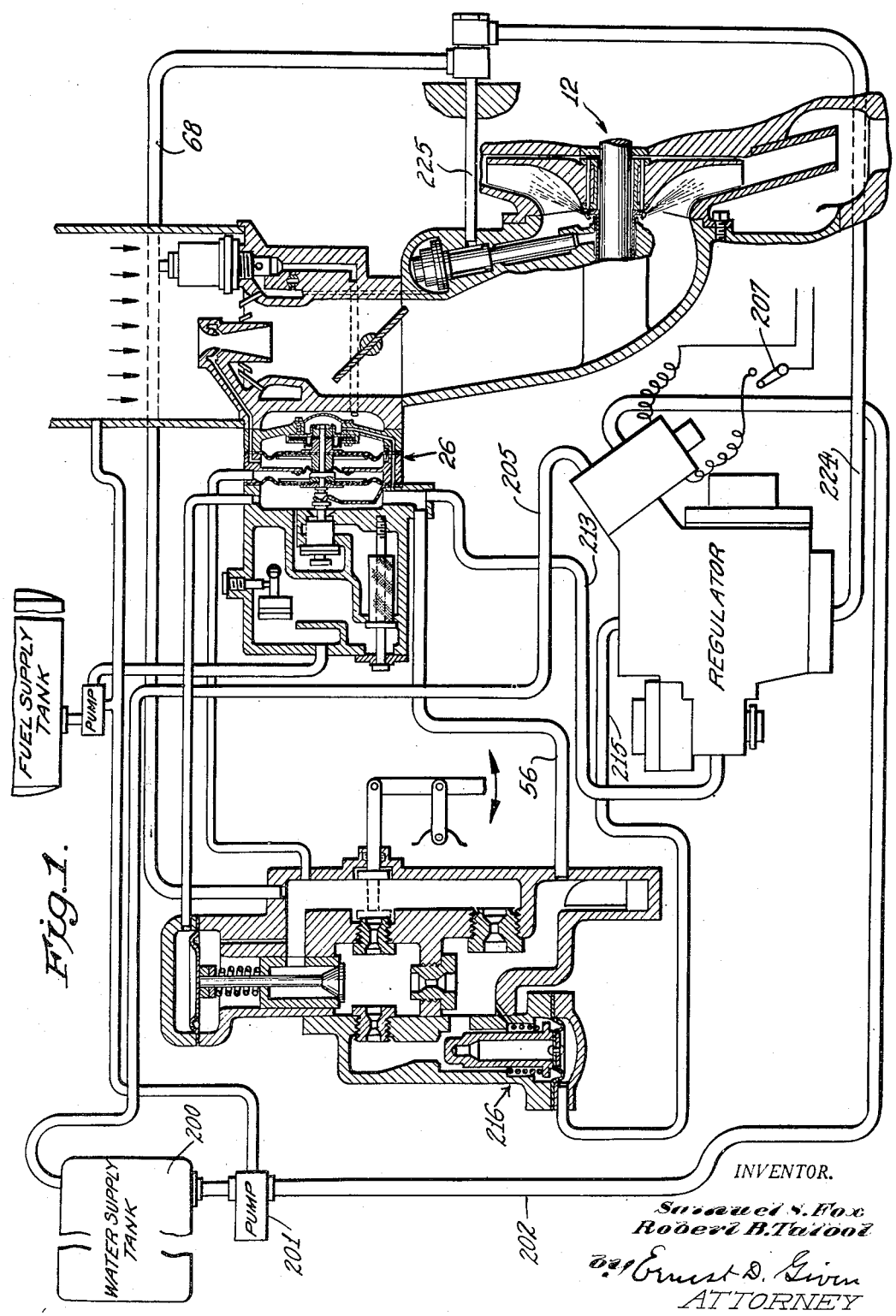

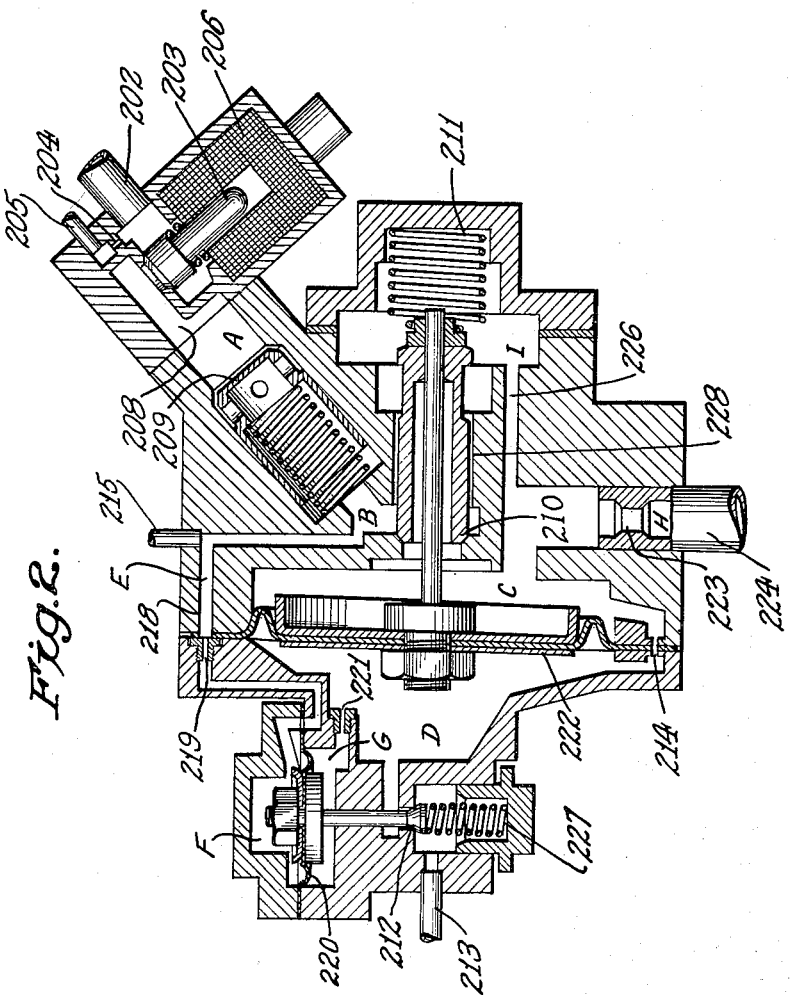

2,599,985

UNITED STATES PATENT OFFICE 2,599,985

ANTIDETONANT INJECTION CONTROL APPARATUS FOR INTERNAL-COMBUSTION ENGINES

Samuel S. Fox, West Hartford, and Robert B. Talbot, Hartford, Conn., assignors to United Aircraft Corporation, East Hartford, Conn., a corporation of Delaware Application May 31, 1946, Serial No. 673,432

16 Claims. (Cl. 123—25)

This invention relates to a method and apparatus for the control of the introduction of a combustion modifying fluid, such as an anti-detonant, into an engine and to the initiation of a change in the fuel-air ratio of the engine at a preselected time interval with respect to the time of introduction of the combustion modifying ingredient.

More particularly this invention relates to the control of the introduction of water into an internal combustion aircraft engine and to the decrease or derichment of the fuel-air mixture strength of the engine at a preselected time interval prior to the time of introduction of the water. As used herein, the word "water" includes mixtures, solutions and suspensions of water and other substances. As an example, water and alcohol is one of the preferred mixtures.

According to the present invention and as one of the objects thereof, a novel regulator for an anti-detonant liquid is provided, which will automatically provide for the operation of the derichment valve a preselected time interval in advance of the initiation of the injection of anti-detonant liquid. Furthermore, the introduction of the anti-detonant is effected gradually and without any sudden surge in the flow of such liquid.

Among the further and more detailed objects of the present invention are to provide a regulator, which will automatically afford a predetermined time interval between the initiation of the derichment operation, by whatever means it may be operated, and the initiation of the introduction of the anti-detonant liquid. It is preferred to effect the derichment and thereafter the introduction of the anti-detonant in response to the supply pressure of the anti-detonant liquid after it has been admitted to the regulator by suitable means. This means may be formed as a part of the regulator as particularly shown and hereinafter described, or it may be separate therefrom.

A further object of the present invention is to provide a regulator of the character above set forth wherein the normal flow of the anti-detonant liquid (after the initiation of such flow) is controlled in proportion to the pressure of an unmetered fuel supply (relative to the pressure of the metered fuel), which differential in turn is a function of the mass air flow through the carburetor, while preventing initial surging of the anti-detonant through to the engine as above set forth.

A further object of the present invention resides in the provision of an anti-detonant injection regulator having means adapted to block off or restrict flow of anti-detonant through the regulator to the engine until and after the pressure of the anti-detonant in the regulator has caused actuation of the associated derichment control means, and also having means for regulating the application of unmetered fuel pressure to the regulator in accordance with the operation of the derichment control means.

Furthermore, according to the present invention, means is provided for preventing immediate build up of unmetered fuel pressure in the regulator until the derichment controls have operated. The unmetered fuel pressure in the regulator is then utilized to control valve means which gradually and without surges admits anti-detonant to the engine.

According to the present invention the following is the cycle of operations: (1) anti-detonant upon admission to the regulator immediately brings about operation of the derichment control means; (2) anti-detonant as admitted to the regulator causes opening of an unmetered fuel valve after a time delay; (3) the build up of unmetered fuel pressure in the regulator which is brought about by the valve mentioned above, causes a further valve to be actuated gradually to admit anti-detonant to the engine. This sequence of operation is so timed that the resultant change in engine power is as smooth as in normal acceleration.

Other and more detailed objects of the present invention will become apparent from the following description and appended claims when considered in connection with the accompanying drawings, in which:

Figure 1 is a schematic diagram showing a carburetor and including a derichment control means and a system for the introduction of an anti-detonant liquid into the engine, including a regulator in accordance with the present invention; and Figure 2 is a view substantially in central vertical section of the anti-detonant flow regulator.

Referring first to Fig. 1, there is shown a system which in its broad aspects is essentially similar to the system shown and described in detail in the copending application of Samuel S. Fox, Serial No. 530,935, filed April 13, 1944, now Patent Number 2,521,002, issued September 5, 1950, and entitled "Water Injection Derichment Device."

From the point of view of the present invention, the subject matter shown in Fig. 1 comprises a supercharger and fuel discharge valve generally indicated at 12. Anti-detonant liquid is supplied to the discharge valve through a pipe 224, and fuel is supplied thereto through a pipe 68. The pipes 224 and 68 discharge into a common header 225. There is also shown a carburetor generally indicated at 26 and a derichment control mechanism or means generally indicated at 216, the mechanism 216 and the carburetor 26 being connected by a pipe 56 through which unmetered fuel passes.

There is also illustrated as a source of supply of anti-detonant liquid a tank 200 and a pump 201 interposed in a supply pipe 202 from this tank 200 to the regulator, identified by that word on the drawing. The pump 201 maintains the supply of anti-detonant liquid to the regulator under a predetermined pressure. This regulator forms the particular subject matter of the present invention. A vent pipe 205 passes vapor and air from the regulator back to the tank 200. The general operation of these parts and their construction is fully set forth in application Serial No. 530,935, aforesaid.

The problem solved by the apparatus of the present invention is to control the supply of anti-detonant liquid to the engine, so that this supply will be automatically initiated at a predetermined time interval after derichment action is effected by the valve 216 and that the initiation is effected gradually, so as to avoid excessive surges of anti-detonant flow. Further, once the introduction of anti-detonant liquid is initiated, its rate of supply or flow will be automatically controlled in accordance with the demands, which from a practical point of view may be proportional to the air flow through the carburetor.

In any means of this kind some apparatus must be provided for the initiation of the operations calling for a supply of anti-detonant liquid. As shown in Fig. 1, this means comprises a switch 207 which may be operated manually or automatically.

Referring now to Fig. 2 of the drawing, wherein the regulator of the present invention is illustrated in detail, there is shown at 206 a solenoid coil having as its armature a valve member 203, which is spring-pressed toward its closed position. This valve is interposed between the pipe 202 and the regulator of Fig. 2 and comprises a part of the regulator assembly. A passage 208, also designated chamber A, is on the downstream side of the valve. When the switch 207 (Fig. 1) is closed, the solenoid 206 will be energized by a suitable source of current (not shown) in circuit with the switch to open the valve 203. While there is shown in the accompanying drawing an electrical means for opening this valve, it will be understood that any desired means, including mechanical and/or hydraulic means could be alternatively employed for this purpose. Furthermore, while the valve 203 is shown formed as a part of the regulator illustrated in detail in Fig. 2, this valve might be formed as a separate unit and located at a desired distance from the regulator. A restricted vent 204 is provided, as shown, to allow air and vapor, to flow through the pipe 205 back to the supply tank 200, so as to prevent such vapor from entering into the regulator.

In the regulator there is disclosed, between the chamber A and a further chamber B, a spring loaded check valve 209. It will be understood that this valve is normally held closed by its spring and is only opened when pressure of anti-detonant liquid is supplied to chamber A by the opening of the valve 203. This valve prevents reverse flow through the regulator.

Flow of liquid from chamber B to a further chamber C in the path of the main flow of anti-detonant liquid is normally obstructed or prevented by a valve 210, shown as a substantially hollow cylindrical member slidable in a part of the main casting of the regulator as shown. This valve is arranged to be operated by a diaphragm 222 and is normally urged to a closed position by a compression spring 211. The diaphragm 222 separates the chamber C from a further chamber D.

As soon as the valve 203 is opened and pressure of anti-detonant liquid is supplied to chamber A, it will open valve 209 and pass to chamber B and then will pass through a lateral passage and a pipe 215, as shown (Figs. 1 and 2), to operate the derichment means 216. From a practical point of view, there may be said to be negligible delay or time interval between the initiation of the operation of the apparatus by the opening of the valve 203 and the operation of the derichment means by the transmission of pressure through the pipe 215. While a hydraulic means is shown for operating the derichment means, other suitable means (for instance a solenoid operated derichment valve controlled electrically by a switch responsive to the water pressure in pipe 215) may be used.

Means are provided for supplying to the chamber D a fluid under pressure for moving the valve 210 from its normally closed position to an open position. For this purpose it is preferred to use as the pressure fluid, unmetered fuel at a pressure regulated by the means shown in Fig. 1 and referred to in said application Serial No. 530,935, as aforesaid, which is greater than metered fuel pressure by an amount which is a constant function of the mass air flow through the carburetor. For this purpose, unmetered fuel may be conducted to the regulator of the present invention through a pipe 213. This fuel does not pass directly to the chamber D, but is prevented from such passage by a valve 212, which is spring-pressed toward a normally closed position by a compression spring 227 and is arranged to be opened by suitable means here shown as including a diaphragm 220.

It is desired that the opening of the valve 212 be made responsive to the pressure of the anti-detonant liquid, more particularly to the pressure of that liquid in chamber B. The valve opening should be delayed in respect to the building up of pressure in chamber B for a time period which will be predetermined in practice and which will permit the earlier action of the derichment means in advance of the introduction of anti-detonant liquid into the engine. For this purpose chamber B communicates through an open passage with a passage 218, also designated as chamber E. Pressure in chamber E is prevented from flowing directly and uninterruptedly into chamber F in rear of (here shown above) the diaphragm 220 by delay action means, such as a restriction or bleed 219. As a further and supplemental means for delaying the operation of the valve 212 by the actuation of the diaphragm 220 under the pressure attained in chamber F, there is provided below the diaphragm 220 as seen in Fig. 2 a chamber G, which communicates with the chamber D through a restriction or bleed 221. Both of the bleeds 219 and 221 are effective to delay the action of opening the valve 212 by the diaphragm 220, because the restrictions 219, 221 limit the rate of flow of fluid into and out of chambers F and G respectively. The flow capacity of bleeds 219, 221 is selected to provide a predetermined time delay between the actuation of the derichment valve 216 and the initiation of anti-detonant flow. These bleeds are preferably made removable to facilitate an adjustment of the time delay; or if desired they may be made adjustable, in a known manner. It will be seen that the actuation of the valve 212 is in response to the supplying of pressure of the anti-detonant liquid to the chamber B and is instituted after a predetermined time delay following the building up of pressure in chamber B. When the valve 212 is opened, pressure of the unmetered fuel from the pipe 213 passes directly to chamber D and is effective against the left-hand side of the diaphragm 222 to move this diaphragm to the right and hence to open the valve 210 against the compression of the spring 211 and the fluid pressure in chamber C. This permits the flow of the anti-detonant liquid directly from chamber B to chamber C causing the pressure in chamber C to increase until it is substantially equal to the unmetered fuel pressure in chamber D. Chamber C is connected to pipe 224 through an anti-detonant metering restriction or orifice 223 and a chamber H on the downstream side of that orifice.

Chamber C is further in open communication through a passage 226 with a chamber I in rear of the valve 210 to provide for balancing the pressures on both ends of the valve. When the valve 210 is closed, before the pressure in chamber B is fully reduced, sufficient clearance at 228 is provided around the stem of the valve 210 to allow the pressure in chamber B to bleed out to chamber I and through passage 226 to chamber C.

In order that pressure during the normal non-operating condition of the regulator be maintained constant throughout, that is in order that pressures be equalized in all the lettered chambers with the exception of chamber A when the valve 209 is closed, there is provided a further bleed passage 214 between chambers D and C.

Thus during any period of inaction of the regulator, all the lettered chambers (except chamber A) shown will be filled with fluid at the same pressure (the pressure of the metered fuel in line 225), these pressures being equalized over a short period of time through the several bleed passages and other passages above described.

Then when the introduction of anti-detonant liquid is called for by the closing of switch 207 to open the valve 203 by energizing the solenoid 206, pressure of anti-detonant liquid passes to chamber B through the check valve 209. The derichment means 216 is first and almost instantaneously actuated. The valve 210 is thereafter opened after a predetermined time delay following the opening of valve 203 and following the actuation of the derichment means, under the control of the delay bleeds 219 and 221 and due to the actuation of diaphragm 220 which opens the valve 212. When this valve 212 is opened, the pressure of unmetered fuel passes to chamber D. As this pressure is somewhat greater than that of the anti-detonant liquid in chamber C, the valve 210 will be moved to the right as seen in Fig. 2. However, due to the action of the spring 211 and the back pressure of the liquid in chamber C, and because valve 212 opens relatively slowly to gradually admit the fuel from unmetered pressure line 213 to chamber D, this opening movement will be gradual in character, thus positively preventing any flow surges of the anti-detonant liquid through the metering orifice 223, chamber H and pipe 224 to the engine. After the parts have come to an equalized or balanced position, the water pressure in chamber C will be maintained by valve 210 substantially equal to the unmetered fuel pressure in chamber D; consequently the water pressure drop across jet 223 is maintained substantially equal to the fuel metering head between lines 56 and 68 and the water flow is controlled in accordance with the mass air flow to the engine. This condition remains until further flow of anti-detonant liquid is not desired, at which time the switch 207 is opened and the solenoid valve 203 is closed by its associated spring. The valve 209 then almost immediately closes as there is nothing to keep it open against its associated spring. Thereafter pressure gradually equalizes in the several chambers, except chamber A, and the valve 212 and hence valve 210 are closed by their associated springs 227 and 211. In this equalization, it may be that some of the liquid from either of chambers C or D flows into the other of these chambers through the bleed passage 214. This has been found to be immaterial as affecting the operation, as a small amount of fuel introduced with the anti-detonant liquid will not be sufficient to change the operation substantially. On the other hand, a small amount of anti-detonant liquid in the chamber D will not affect the actuation of the diaphragm 222 by the liquid pressure in chamber D.

When the pressure is originally built up in chamber B due to the opening of valve 203 and 209, it might seem that this pressure could flow directly through the bleed 228, chamber I, passage 226, a part of chamber C and thence through metering passage 223 and chamber H to the engine through pipe 224. While this path may be taken by a very small amount of the anti-detonant liquid, it should be understood that the bleed or clearance 228 is so small in cross section that the amount of liquid flowing through this path is wholly immaterial and will have no substantial effect upon the operation of the regulator or engine; in other words passage 228 serves to equalize the pressures in chambers C and B after valve 210 closes, but the passage 228 is of such small flow capacity, or sufficiently restricted, as to have practically no effect when the regulator is in operation and the valve 210 is open.

While we have shown and described herein but one embodiment of our present invention, some alternative constructions and arrangements have been suggested and others will present themselves or be obvious from the foregoing description to those skilled in the art. We do not wish to be limited, therefore, except by the appended claims, which are to be construed validly as broadly as the state of the prior art permits.

What is claimed is:

1. In a method of operating an aircraft engine having fuel and water supply systems, the steps of, first decreasing the fuel flow to the engine by a predetermined amount in relation to the unmetered fuel flow, and after a predetermined lapse of time introducing water into said engine.

2. An anti-detonant regulator for an internal combustion engine which comprises, a cut-off valve for controlling the flow of anti-detonant to said regulator, a normally closed valve for controlling the flow of anti-detonant through said regulator, a passage between said valves, a second passage connected to said first named passage to carry the anti-detonant to actuate an engine control device, means to control said second named valve, and a passage connected to said control means and to said first named passage between said first two named valves having a restriction constructed and arranged so that the last named valve means will be actuated a predetermined time after the engine control device.

3. The combination with a carburetor system for an internal combustion engine wherein the carburetor of such system is provided with means for metering a fuel supply to the engine and also with means affording a supply of unmetered fuel at a pressure dependent upon the mass air flow through the carburetor, and having a fuel derichment means associated with the carburetor system, of a regulator for a supply of an antidetonant liquid to an engine, comprising a shut-off valve for controlling the flow of anti-detonant liquid to the regulator, an unrestricted connection between said valve and fuel derichment means for actuating said fuel derichment means with a minimum of delay, a normally closed valve for controlling the flow of anti-detonant liquid through the regulator, means including a valve operated in response to the pressure of said liquid to control the normally closed valve, and delay action means for interposing a predetermined delay in the supplying of the liquid pressure to said last named means.

4. The combination with a carburetor system for an internal combustion engine wherein the carburetor of such system is provided with means for metering a fuel supply to the engine and also with means affording a supply of unmetered fuel at a pressure which varies with variations in mass air flow through the carburetor, and having a fuel derichment device associated with the carburetor system, of a regulator for a supply of an anti-detonant liquid to the engine, comprising a shut-off valve for controlling the flow of anti-detonant liquid to the regulator, means for moving said shut-off valve to an open position, a connection between said shut-off valve and said derichment device whereupon said derichment device is activated immediately by anti-detonant liquid pressure, a main diaphragm operated valve for controlling the flow of anti-detonant liquid through the regulator to the engine having a chamber associated therewith, a passageway for conducting unmetered fuel from said supply thereof to said chamber, a normally closed diaphragm operated valve in said passageway, a passage for conducting anti-detonant liquid to operate the diaphragm of the last-named valve from a point in the flow of anti-detonant through the regulator subsequent to its passage through said shut-off valve and prior to its passage through the first named diaphragm operated valve, and a constriction in the conducting passage for anti-detonant liquid to the second named diaphragm operated valve so constructed and arranged as to interpose a substantially predetermined delay in the opening of the second named diaphragm operated valve after the opening of said shut-off valve and the actuation of said derichment means to admit unmetered fuel to actuate and open the first named diaphragm operated valve.

5. The combination with a carburetor system for an internal combustion engine wherein the carburetor of such system is provided with means for metering a fuel supply to the engine and also with means affording a supply of unmetered fuel at a pressure which, for any given metered fuel pressure, is a measure of the fuel flow through the carburetor, and having a fuel derichment device associated with the carburetor system, of a regulator for a supply of an anti-detonant liquid to the engine, comprising a shut-off valve for controlling the flow of anti-detonant liquid to the regulator, means for moving said shut-off valve to an open position, a connection between said shut-off valve and said derichment device whereupon said derichment device is actuated immediately by anti-detonant liquid pressure, a main diaphragm actuated valve for controlling the flow of anti-detonant liquid through the regulator to the engine and having a chamber associated therewith, a second diaphragm operated valve for controlling the flow of unmetered fuel from said supply thereof to said chamber, a passage communicating with the path of flow of the anti-detonant liquid in said regulator between said shut-off valve and said main valve for transmitting the pressure of said anti-detonant liquid to one side of the diaphragm of the second named diaphragm valve, and the other side of the diaphragm of said second named diaphragm valve having a chamber communicating with the first named chamber through a constricted passage providing a retarding influence tending to delay the opening of said second named diaphragm valve after the opening of said shut-off valve so as to delay the opening of the main diaphragm actuated valve at a substantially predetermined time period following the opening of the said shut-off valve and the actuation of said derichment device.

6. An injection regulator for anti-detonant liquid for controlling the injection of such liquid to an internal combustion engine, which comprises in combination, a regulator body having a chamber therein which receives an anti-detonant liquid under pressure only when injection is desired, valve means connected with said chamber normally to restrict the flow of anti-detonant liquid to the engine from said chamber, a second chamber in said regulator adapted to receive fuel under unmetered fuel pressure, valve means in said regulator to shut off and admit fuel under unmetered pressure conditions to such second chamber, and a passageway between said first chamber and said last named valve means including a restriction to inter-correlate the action of both valve means to cause the second valve means to admit fuel under pressure to said second chamber after a time delay following the admission of anti-detonant liquid to the first chamber, and to cause such pressure in said second chamber to build up to cause operation of the first mentioned valve means, said first valve means admitting anti-detonant liquid from the first mentioned chamber to the engine after such time delay.

7. In an anti-detonant supply system for an internal combustion engine, having derichment means associated therewith, an injection regulator for controlling the supply of anti-detonant liquid to the internal combustion engine, said regulator comprising in combination, a regulator body having a chamber therein which receives anti-detonant liquid under pressure only when injection is desired, means subject to the pressure of such liquid in said chamber for operating said derichment means, valve means connected with said chamber normally to restrict the flow of anti-detonant liquid to the engine from said chamber, a second chamber in said regulator adapted to receive fuel under unmetered fuel pressure, valve means in said regulator to shut off and admit fuel under unmetered pressure conditions to such second chamber, and a passageway between said first chamber and said last named valve means including a restriction to inter-correlate the action of both valve means to cause the second valve means to admit fuel under pressure to said second chamber after a time delay following the admission of anti-detonant liquid to the first chamber and to the means for operating said derichment means, and to cause such pressure in said second chamber to build up to cause operation of the first mentioned valve means, said first valve means admitting anti-detonant liquid from the first mentioned chamber to the engine after such time delay.

8. An anti-detonant supply system, including in combination, a regulator for controlling the flow of anti-detonant to an engine having a chamber therein which receives an anti-detonant liquid under pressure, means for controlling the supply of anti-detonant to the regulator, fuel derichment means, means for operating said derichment means upon the supply of anti-detonant to the regulator, normally closed valve means in said regulator for controlling the flow of anti-detonant therethrough to the engine, means for supplying unmetered fuel to the regulator, means subject to the pressure of supplied unmetered fuel for controlling the aforesaid valve means, valve means for controlling unmetered fuel supply to the regulator, and a passageway between said chamber and said last named valve means including a restriction for causing said last named valve means to operate after a predetermined time delay following the operation of said derichment control means to admit unmetered fuel under pressure to the regulator, said unmetered fuel pressure causing opening of said normally closed valve means thereby to supply anti-detonant through the regulator to the engine.

9. An anti-detonant supply system, including in combination, a regulator for controlling the flow of anti-detonant to an engine, means for controlling the supply of anti-detonant to the regulator, normally closed valve means in said regulator for controlling the flow of anti-detonant therethrough to the engine, an inlet passage between said means for controlling the supply of anti-detonant to the regulator and said normally closed valve means, means including a passage connecting said derichment means directly to said inlet passage for operating said derichment means without delay upon the supply of anti-detonant to the regulator, means for supplying a medium under pressure for controlling anti-detonant metering by the regulator, means subject to the pressure of said medium for controlling the aforesaid valve means, valve means responsive to anti-detonant pressure for controlling supply of such pressure medium to the regulator, means including a restriction for causing said last named valve means to operate after a predetermined time delay following the operation of said derichment control means to admit the medium under pressure to the regulator, said pressure of said medium causing opening of said normally closed valve means thereby to supply anti-detonant through the regulator to the engine.

10. A liquid flow regulator for supplying liquid to an engine, comprising a housing having a passage for the liquid to said engine, said passage having a valve therein, a part of said passage downstream of said valve forming a chamber, a diaphragm defining one wall of said chamber, said diaphragm being connected to said valve, a second chamber on the other side of said diaphragm, a passage for connecting a regulating pressure to said second chamber, a normally closed valve in said passage, a second diaphragm connected to said last named valve, third and fourth chambers on opposite sides of said second diaphragm, a passage from said first mentioned passage upstream of said first named valve to the side of said second diaphragm for urging the normally closed valve open, and a restricted passage from said second chamber to the other side of said second diaphragm.

11. A liquid flow regulator for supplying liquid to an engine, comprising a housing having a passage for the liquid to said engine, said passage having a valve therein, a part of said passage downstream of said valve forming a chamber, a diaphragm defining one wall of said chamber, said diaphragm being connected to said valve, a second chamber on the other side of said diaphragm, a passage for connecting a regulating pressure to said second chamber, a normally closed valve in said passage, a second diaphragm connected to said last named valve, third and fourth chambers on opposite sides of said second diaphragm, a restricted passage from said first mentioned passage upstream of said first named valve to the side of said second diaphragm for urging the normally closed valve open, and a passage from said second chamber to the other side of said second diaphragm.

12. A liquid flow regulator for supplying liquid to an engine, comprising a housing having a passage for the liquid to said engine, said passage having a valve therein, a part of said passage downstream of said valve forming a chamber, a diaphragm defining one wall of said chamber, said diaphragm being connected to said valve, a second chamber on the other side of said diaphragm, a passage for connecting a regulating pressure to said second chamber, a normally closed valve in said passage, a second diaphragm connected to said last named valve, third and fourth chambers on opposite sides of said second diaphragm, a restricted passage from said first mentioned passage upstream of said first named valve to the side of said second diaphragm for urging the normally closed valve open, and a restricted passage from said second chamber to the other side of said second diaphragm.

13. A liquid flow regulator for injecting a liquid into an internal combustion engine, comprising an intake chamber, a metering chamber, a conduit for connecting said outlet chamber to an engine, a liquid flow valve located between said inlet chamber and said metering chamber, one side of said metering chamber being a diaphragm, said diaphragm being connected to said flow valve, a pressure chamber located on the other side of said diaphragm, a conduit for connecting the last named chamber to an operating pressure, a second valve located between said conduit and said last named chamber, a spring biasing said last named valve to a closed position, a delay chamber, one side of said delay chamber being a diaphragm, a liquid chamber located on the other side of said last named diaphragm, a passage connecting the delay chamber to said pressure chamber, a restricted passage connecting said liquid chamber to said inlet chamber, and a connection between the last named valve and said last named diaphragm.

14. A liquid flow regulator for injecting a liquid into an internal combustion engine, comprising an intake chamber, a metering chamber, a conduit for connecting said outlet chamber to an engine, a liquid flow valve located between said inlet chamber and said metering chamber, one side of said metering chamber being a diaphragm, said diaphragm being connected to said flow valve, a pressure chamber located on the other side of said diaphragm, a conduit for connecting the last named chamber to an operating pressure, a second valve located between said conduit and said last named chamber, a spring biasing said last named valve to a closed position, a delay chamber, one side of said delay chamber being a diaphragm, a liquid chamber located on the other side of said last named diaphragm, a restricted passage connecting the delay chamber to said pressure chamber, a passage connecting said liquid chamber to said inlet chamber, and a connection between the last named valve and said last named diaphragm.

15. A liquid flow regulator for injecting a liquid into an internal combustion engine, comprising an intake chamber, a metering chamber, a conduit for connecting said outlet chamber to an engine, a liquid flow valve located between said inlet chamber and said metering chamber, one side of said metering chamber being a diaphragm, said diaphragm being connected to said flow valve, a pressure chamber located on the other side of said diaphragm, a conduit for connecting the last named chamber to an operating pressure, a second valve located between said conduit and said last named chamber, a spring biasing said last named valve to a closed position, a delay chamber, one side of said delay chamber being a diaphragm, a liquid chamber located on the other side of said last named diaphragm, a restricted passage connecting the delay chamber to said pressure chamber, a restricted passage connecting said liquid chamber to said inlet chamber, and a connection between the last named valve and said last named diaphragm.

16. In the method of operating an aircraft engine for fuel and water supply systems, the steps of first decreasing the fuel flow to the engine by a predetermined amount, and after a predetermined lapse of time introducing water into said engine.

SAMUEL S. FOX.
ROBERT B. TALBOT.

REFERENCES CITED

The following references are of record in the file of this patent:

UNITED STATES PATENTS

| Number | Name | Date |
| --- | --- | --- |
| 2,392,565 | Anderson et al. | Jan. 8, 1946 |
| 2,397,984 | Schorn | Apr. 9, 1946 |
| 2,431,590 | Smith | Nov. 25, 1947 |
| 2,509,648 | Mock | May 30, 1950 |